United States Patent [19]

Troughton

[11] Patent Number: 4,597,502

[45] Date of Patent: Jul. 1, 1986

[54] INDUSTRIAL CONTAINER WITH REMOVABLE END CLOSURES AND METHOD OF MANUFACTURE

[75] Inventor: Thomas D. Troughton, Richmond, Calif.

[73] Assignee: Rheem Manufacturing Corporation, New York, N.Y.

[21] Appl. No.: 636,798

[22] Filed: Aug. 2, 1984

Related U.S. Application Data

[63] Continuation of Ser. No. 349,039, Feb. 16, 1982, abandoned.

[51] Int. Cl.[4] .............................................. B23K 31/06
[52] U.S. Cl. .................................. 220/67; 220/77; 220/355; 220/359; 29/401.1; 413/4; 413/7
[58] Field of Search ................. 29/458, 401.1, 426.4, 29/426.2, 402.07, 402.04; 413/4, 7, 19, 34; 220/67, 68, 80, 77, 78, 355, 359

[56] References Cited

U.S. PATENT DOCUMENTS

| | | | |
|---|---|---|---|
| 2,004,964 | 6/1935 | Westgate et al. | 413/4 |
| 2,196,182 | 2/1939 | Arnesen | 29/403.3 |
| 2,943,386 | 6/1960 | Katz | 413/4 |
| 3,510,932 | 5/1970 | Lammers et al. | 29/426.2 |
| 3,603,476 | 9/1969 | Coppens | 220/67 |
| 3,734,043 | 5/1973 | Rosenbloom | 413/8 |
| 3,922,984 | 12/1975 | Zuideveld et al. | 220/67 |

Primary Examiner—Daniel C. Crane
Assistant Examiner—David B. Jones
Attorney, Agent, or Firm—Robin, Blecker & Daley

[57] ABSTRACT

A reusable industrial drum is formed by temporarily joining the periphery of the end closure to the rim of the cylindrical shell by curling to produce a spiral seam. The outermost layer of the seam, consisting of a portion of the end closure, is cut to permit the end closure element and shell to be separated and disassembled. Further processing operations may take place on the closure element and shell separately. The closure element is thereafter re-mated with the shell, a seam sealant having previously been introduced between the parts, and a locking ring such as a bolt or chime ring is placed over the reassembled seam. The locking ring surrounds the periphery of the seam to hold the seam together. After use, the drum can be readily disassembled for reprocesing and reuse by simply removing the bolt or chime ring.

5 Claims, 4 Drawing Figures

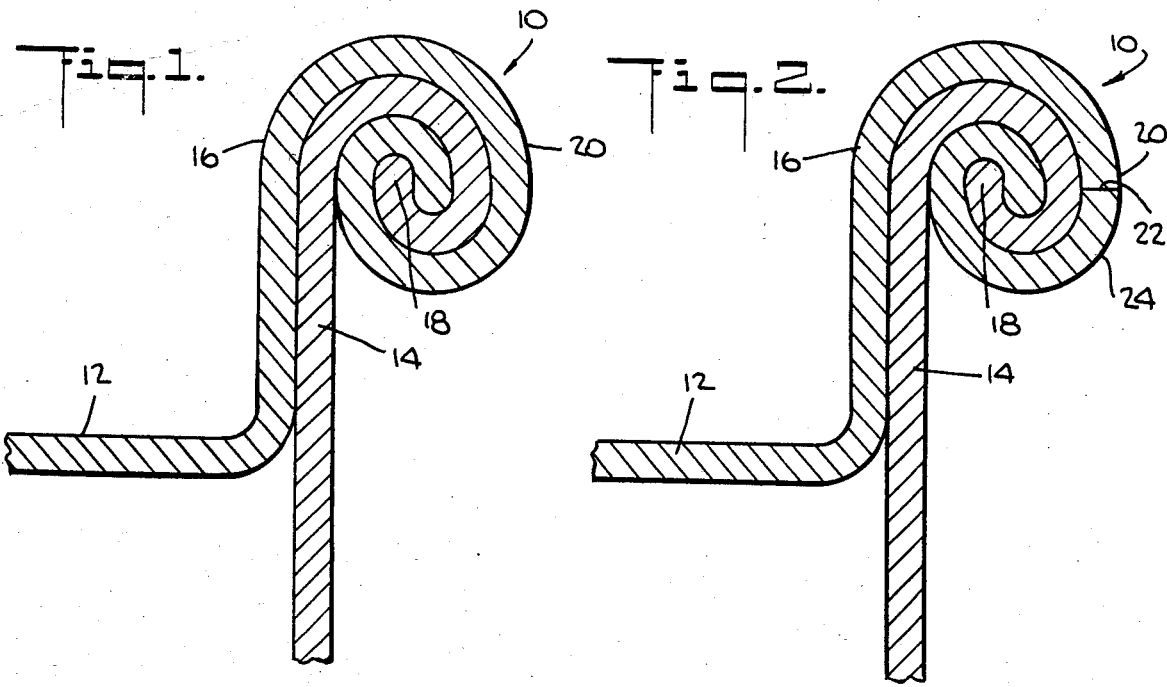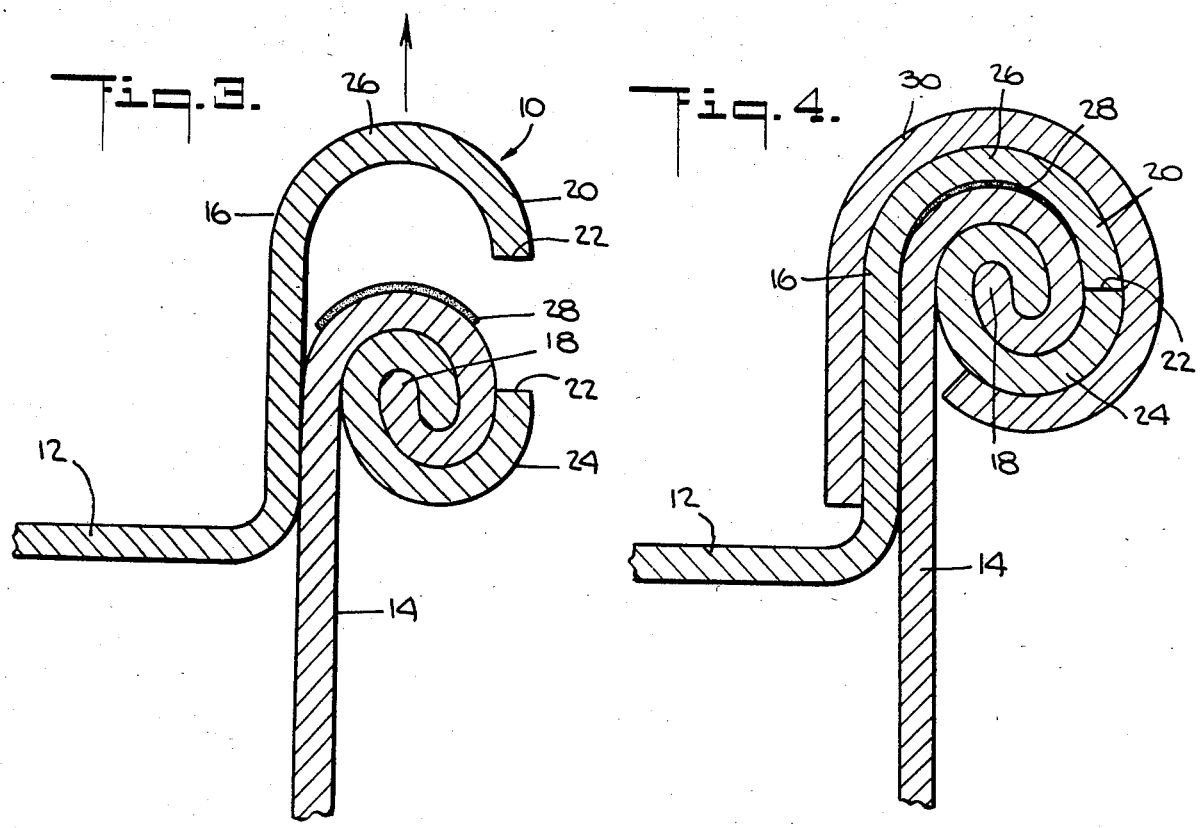

INDUSTRIAL CONTAINER WITH REMOVABLE END CLOSURES AND METHOD OF MANUFACTURE

This application is a continuation of application Ser. No. 349,039, filed Feb. 16, 1982, now abandoned.

BACKGROUND OF THE INVENTION

This invention relates generally to a large capacity industrial container such as a drum or the like and to its method of manufacture. The invention is specifically directed to a method of manufacture for a container which has an end closure element, such as a head or bottom, that can be readily removed, processed and reassembled.

While a number of methods for enabling disassembly, reconditioning and reassembly of drums are known, such arrangements suffer from various shortcomings. Several of the methods used to manufacture reusable large capacity containers require the use of extremely complex seam constructions utilizing multiple elements. Such constructions are relatively expensive and wasteful of material. The prior seam constructions have been known to cause difficulty with certain reprocessing and reconditioning operations that must be performed in order to recondition the container parts and often such seams are incapable of providing an adequate pressure seal. Certain of the known methods utilized to remove the container closure elements cause a loss of drum height and capacity upon reassembly, rendering the container unsuitable for certain applications.

Accordingly, it is an object of this invention to provide a method of manufacture of a container permitting ready disassembly of the closure elements and the shell yet providing a secure seal while in use.

It is another object of this invention to provide a method of manufacture of a container which permits the disassembly and reprocessing of the container with full access to the interior surfaces of the closure elements and shell.

It is another object of this invention to provide a method of manufacture of a container that permits the reprocessing and reuse of the container without the loss of height or capacity during the reprocessing operations.

It is another object of this invention to provide a method of manufacture of a container that has a pressure secure seam.

SUMMARY OF THE INVENTION

In accordance with the invention there is provided the method of manufacturing a container comprising the steps of: assembling an end closure element to a container shell; forming a temporary circumferential joint between said closure element and said shell by jointly curling the periphery of said closure element with the rim of said shell to form a spiral seam with said closure element on the outside; severing the outermost layer of said spiral seam to provide a separable seam to permit separation of said closure element from said shell; and perfecting said joint by disposing a locking ring about the assembled component parts of said separable seam.

BRIEF DESCRIPTION OF THE DRAWINGS

In order to better understand the invention, reference is made to the following drawings taken in connection with the detailed specification to follow.

FIG. 1 is a fragmentary sectional view of the preliminary manufacturing operation in accordance with the invention in which the closure element and shell have been temporarily joined by a spiral seam;

FIG. 2 is a sectional view similar to FIG. 1 showing a subsequent manufacturing operation wherein the outermost layer of the spiral seam is severed;

FIG. 3 is a sectional view similar to FIG. 1 showing a further manufacturing operation wherein the closure element is separated from the container shell; and FIG. 4 is a sectional view similar to FIG. 1 showing the perfected joint with the locking ring in place.

The same reference numerals are used throughout the various figures of the drawings to designate the same or similar parts.

DESCRIPTION OF THE PREFERRED EMBODIMENT

The drawings illustrate a method of manufacture of an industrial container having a removable and reusable end closure. The invention is particularly applicable to large capacity containers such as drums. The drawings illustrate the invention by showing the attachment of an end closure to a drum shell. The closure can be either the head or bottom, and which one is shown in the drawings depends on ones point of view. The machinery used to perform the forming operations has not been included in this description because it forms no part of the invention and any suitable equipment known to those skilled in the art can be used.

FIG. 1 is a section through one edge of the temporary joint 10 formed between an end closure element 12 and a drum shell 14. The closure element has an upwardly extending (as viewed in the drawing) circumferential skirt 16 positioned within the upper portion of a generally cylindrical shell 14 with the joint 10 formed by jointly curling the periphery of element 12 with the rim 18 of shell 14 to form a spiral seam, as shown, with the closure element 12 on the outside. Prior thereto, the appropriate drawing, punching, painting and plating operations have been performed on the closure elements and shell. Shell 14 and closure element 12 are constructed of malleable material and of any suitable guage. In order to facilitate the forming operations, the periphery of closure element 12 may be partially pre-curled.

After the preliminary operations have been performed, closure element 12 will be joined to shell 14 by spiral seam 20 circumscribing the periphery of the drum. Spiral seam 20 may have any of the usual configurations with any desired number of turns.

After the joining operation has been performed as shown in FIG. 1, the next step of the method of manufacture is performed as shown in FIG. 2. The outermost layer of spiral seam 20 is cut or severed along line 22 circumferentially of the joint 10 at a point, as viewed in the drawing, that is at or above the equator, preferably in the vicinity of the equator as shown, in order to permit closure element 12 to be separated from shell 14 as illustrated in FIG. 3. When disassembled, the extreme peripheral portion 24 of closure element 12 will remain attached to the curled rim portion of shell 14 while the new peripheral portion 26 of element 12 retains a substantially semicircular curl.

After removal, further processing operations may be performed on both shell 14 and closure element 12. Particularly, gasket material 28 may be placed either on the uppermost portion of the curled rim of shell 14 or on the underside of portion 26 of element 12 to seal joint 10 when reassembled. Drum closure element 12 and shell 14 may then be reassembled to re-form seam 20, and further processing operations on the drum may then be performed.

In order to perfect joint 10, a locking ring 30, which may either be a bolt ring or a chime ring, is disposed over the reassembled spiral seam 20 as shown in FIG. 4. Any of the usual forms and types of bolt or chime rings may be utilized by either bolting or seaming same into place around seam 20. Ring 30 is contiguous with and embraces both the original and new periphery of closure element 12, firmly joining the parts together and preventing any displacement of closure element 12 with respect to drum shell 14. Reassembly of the end closure 12 to the shell 14 may be accomplished by either the drum manufacturer or the user thereof depending upon the filling method or other processing involved. Having used the subject drum, the locking ring 30 can be removed in known manner, the end closure or closures can be separated from the shell, and the parts can be reconditioned. For example, they can be cleaned and coated with a protective film in a sterilization process. Then the drum can be reassembled as shown in FIG. 4. The subject invention provides full and unobstructed access to all of the drum interior surfaces.

Other reprocessing operations such as resizing the mating cylindrical walls, restriking the end closures and replating or repainting the component parts can be carried out when the drum is disassembled. During reassembly, new sealing material 28 is placed within the disassembled spiral seam 20 and the previously described assembly procedure is repeated. The reassembly operation occurs without the loss of any drum capacity.

By way of summary, the present invention provides a method for fabricating a container with readily removable end closure elements. The container components, such as the head, bottom and shell, are subject to the usual preassembly processing operations. The end closure elements and shell are then joined by a temporary spiral seam in which the periphery of the closure element forms the outer layer thereof. Thereafter the outermost layer of the temporary seam is cut. This permits the separation and removal of the closure element from the shell. Further processing operations may then take place upon the container shell and closure elements. In order to reassemble the container; sealing compound is placed within the disassembled spiral seam parts and the spiral seam is reassembled. A mechanical locking ring, such as a bolt or chime ring, is then disposed over the reassembled seam to hold it together.

To disassemble the container for reprocessing, it is only necessary that the locking ring be removed from the seam and that the container closure elements be again removed. The reprocessing operations can then take place with full access to the interior surfaces of the shell and the closure elements. Reassembly of the container is accomplished as before. Because the portion of the spiral seam that remains integral with the closure element is re-mated with the same seam parts from which it was separated, a pressure secure seam is assured.

Although the present invention has been described with reference to the presently preferred embodiment, it will be understood by those skilled in the art that modifications and variations may be resorted to without departing from the spirit and scope of the invention as defined in the appended claims.

What is claimed is:

1. A method of manufacturing an industrial container comprising the steps of: assembling an end closure element to a container shell; forming a temporary circumferential joint between said closure element and said shell by jointly curling the periphery of said closure element with the rim of said shell to form a sprial seam with said closure element on the outside; severing the outermost layer of said spiral seam along a line circumferential of said joint at a point of maximum joint circumference to provide a separable seam to permit separation of said closure element from said shell; and perfecting said joint by disposing a locking ring about the assembled component parts of said separable seam so that said locking ring is contiguous with the outer most layer of said spiral seam at said point of maximum circumference.

2. The method of claim 1, comprising the additional steps of separating said closure element from said shell after said severing step, performing a processing step on one or more of the parts of said container, and reassembling said closure element to said shell prior to the step of perfecting said joint.

3. The method of claim 2, wherein said processing step comprises disposing sealing material between said closure element and said shell within said separable seam prior to reassembling said closure element to said shell.

4. The method of claim 1, comprising the additional steps of removing said locking ring, separating said closure element from said shell along said separable seam and processing said closure element and/or said shell, followed by reassembling said closure element to said shell and reapplying a locking ring about the reassembled component parts of said separable seam.

5. An industrial container having an end closure element assembled to a container shell with a circumferential joint between said closure element and said shell, said joint being in the form of a spiral seam in which the periphery of said closure element and the rim of said shell are jointly curled with the closure element on the outside, a circumferential line of severance through the outermost layer of said spiral seam at a point of maximum seam circumference such that in the the absence of a locking ring said end closure element is separable from said shell, and a locking ring embracing said spiral seam to preclude separation of said closure element from said shell, said locking ring being continguous with the outer most layer of said spiral seam at said point of maximum circumference.

* * * * *